United States Patent Office 3,661,999
Patented May 9, 1972

---

3,661,999
PHENANTHRENE DERIVATIVES
Wataru Nagata, Nishinomiya-shi, Tadao Terasawa, Takatsuki-shi, and Tsutomu Aoki, Amagasaki-shi, Japan, assignors to Shionogi & Co., Ltd., Osaka, Japan
No Drawing. Filed Dec. 6, 1968, Ser. No. 781,964
Claims priority, application Japan, Dec. 26, 1967, 42/85,159, 42/85,160; Feb. 13, 1968, 43/9,012
Int. Cl. C07c 49/76
U.S. Cl. 260—590                    9 Claims

ABSTRACT OF THE DISCLOSURE

Phenanthrene derivatives useful as medicaments for anti-androgenic therapy and acne-prophylactic or treatment thereof.

---

The present invention relates to a new group of highly potent anti-androgenic agents and more particularly to the compounds of the structural formula:

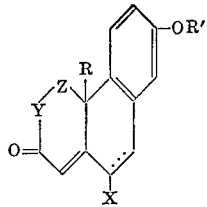

wherein R and R' each is a lower alkyl group; X is a member selected from the group consisting of hydrogen atom and a halogen atom; Y—Z is a member selected from the group consisting of —CH$_2$—CH$_2$—, —CH=CH—, and

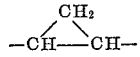

and the dotted line indicates an optional 9,10 double bond.

As the substituents R and R' in the above-cited general Formula I, a lower alkyl group such as methyl, ethyl, propyl, i-propyl, butyl, i-butyl, pentyl, hexyl, or the like may be exemplified. Halogen atoms represented by the symbol X are fluorine and chlorine.

Representative of the compounds as defined by the general Formula I when Y—Z is —CH$_2$—CH$_2$— are:

4aβ-methyl-7-methoxy-2,3,4,4a-tetrahydrophenanthren-2-one,
4aβ-ethyl-7-methoxy-2,3,4,4a-tetrahydrophenanthren-2-one,
4aβ-methyl-7-propoxy-2,3,4,4a-tetrahydrophenanthren-2-one,
4aβ-butyl-7-methoxy-2,3,4,4a-tetrahydrophenanthren-2-one,
10α-fluoro-4aβ-methyl-7-methoxy-2,3,4,4a,9,10-hexahydrophenanthren-2-one,
10α-fluoro-4aβ-ethyl-7-methoxy-2,3,4,4a,9,10-hexahydrophenanthren-2-one,
10β-chloro-4aβ-methyl-7-methoxy-2,3,4,4a,9,10-hexahydrophenanthren-2-one,
10α-chloro-4aβ-methyl-7-methoxy-2,3,4,4a,9,10-hexahydrophenanthren-2-one,
10β-chloro-4aβ-ethyl-7-methoxy-2,3,4,4a,9,10-hexahydrophenanthren-2-one,
10α-chloro-4aβ-ethyl-7-methoxy-2,3,4,4a,9,10-hexahydrophenanthren-2-one,
10α-chloro-4aβ-propyl-7-methoxy-2,3,4,4a,9,10-hexahydrophenanthren-2-one,
10α-chloro-4aβ-methyl-7-hexyloxy-2,3,4,4a,9,10-hexahydrophenanthren-2-one,
10-fluoro-4aβ-methyl-7-methoxy-2,3,4,4a-tetrahydrophenanthren-2-one,
10-fluoro-4aβ-ethyl-7-methoxy-2,3,4,4a-tetrahydrophenanthren-2-one,
10-chloro-4aβ-methyl-7-methoxy-2,3,4,4a-tetrahydrophenanthren-2-one,
10-chloro-4aβ-ethyl-7-methoxy-2,3,4,4a-tetrahydrophenanthren-2-one,
10-chloro-4aβ-pentyl-7-methoxy-2,3,4,4a-tetrahydrophenanthren-2-one, and
10-chloro-4aβ-methyl-7-propoxy-2,3,4,4a-tetrahydrophenanthren-2-one.

Representative of the compounds as defined by the general Formula I when Y—Z is —CH=CH— are:

10-fluoro-4aβ-methyl-7-methoxy-2,4a-dihydrophenanthren-2-one,
10-fluoro-4aβ-ethyl-7-methoxy-2,4a-dihydrophenanthren-2-one,
10-chloro-4aβ-methyl-7-methoxy-2,4a-dihydrophenanthren-2-one,
10-chloro-4aβ-ethyl-7-methoxy-2,4a-dihydrophenanthren-2-one,
10-chloro-4aβ-isopropyl-7-methoxy-2,4a-dihydrophenanthren-2-one,
10-chloro-4aβ-propyl-7-methoxy-2,4a-dihydrophenanthren-2-one,
10-chloro-4aβ-methyl-7-ethoxy-2,4a,-dihydrophenanthren-2-one, and
10-chloro-4aβ-ethyl-7-ethoxy-2,4a-dihydrophenanthren-2-one.

Representative of the compounds as defined by the general Formula I when Y—Z is

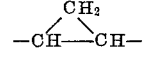

are:

4aβ-methyl-3α,4α-methylene-7-methoxy-2,3,4,4a,9,10-hexahydrophenanthren-2-one,
4aβ-ethyl-3α,4α-methylene-7-methoxy-2,3,4,4a,9,10-hexahydrophenanthren-2-one,
4aβ-butyl-3α,4α-methylene-7-methoxy-2,3,4,4a,9,10-hexahydrophenanthren-2-one,
4aβ-methyl-3α,4α-methylene-7-hexyloxy-2,3,4,4a,9,10-hexahydrophenanthren-2-one,
4aβ-methyl-3α,4α-methylene-7-methoxy-2,3,4,4a-tetrahydrophenanthren-2-one,
4aβ-ethyl-3α,4α-methylene-7-methoxy-2,3,4,4a-tetrahydrophenanthren-2-one,
4aβ-propyl-3α,4α-methylene-7-methoxy-2,3,4,4a-tetrahydrophenanthren-2-one,
4aβ-methyl-3α,4α-methylene-7-butoxy-2,3,4,4a-tetrahydrophenanthren-2-one,
10-fluoro-4aβ-methyl-3α,4α-methylene-7-methoxy-2,3,4,4a-tetrahydrophenanthren-2-one,
10-fluoro-4aβ-ethyl-3α,4α-methylene-7-methoxy-2,3,4,4a-tetrahydrophenanthren-2-one,
10-chloro-4aβ-methyl-3α,4α-methylene-7-methoxy-2,3,4,4a-tetrahydrophenanthren-2-one, 10-chloro-4aβ-ethyl-3α,4α-methylene-7-methoxy-2,3,4,4a-tetrahydrophenanthren-2-one,
10-chloro-4aβ-propyl-3α,4α-methylene-7-methoxy-2,3,4,4a-tetrahydrophenanthren-2-one, and
10-chloro-4aβ-methyl-3α,4α-methylene-7-pentyloxy-2,3,4,4a-tetrahydrophenanthren-2-one.

The compounds of the general Formula I may be more specifically indicated by the following structural formulae:

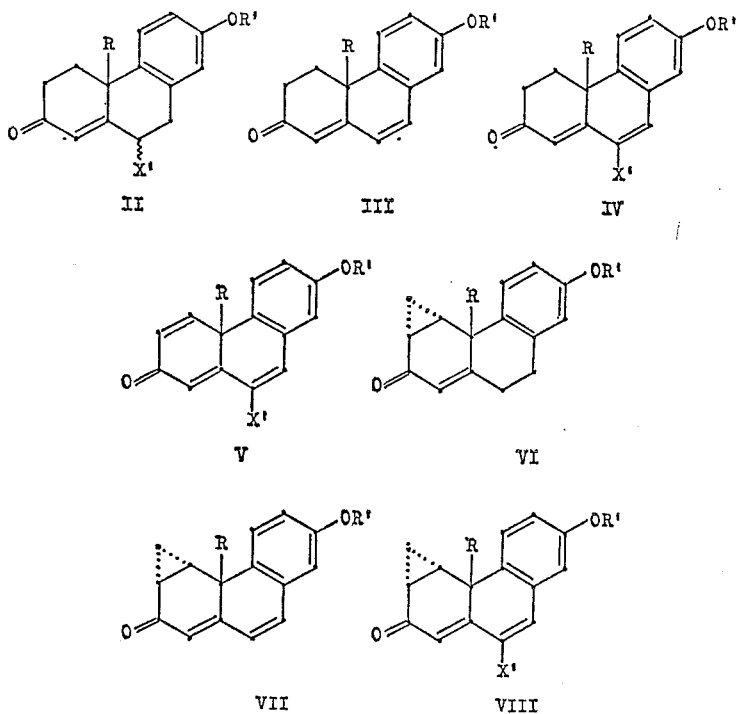

wherein R and R' each has the same meanings as described above; X' represents fluorine or chlorine; and ε means the substituent X' has the α- or β-configuration.

All the compounds may be prepared from the well-known compounds of the general formula:

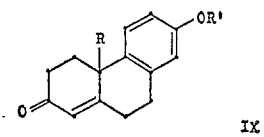

wherein R and R' each has the same meanings as described above.

The compounds of the general Formula II can be prepared by ketalizing the starting compound (IX) to yield a ketal derivative of the general Formula X, epoxidizing the latter with a peracid to yield an epoxy derivative of the general Formula XI, interacting the latter with a hydrogen halide (HX'; wherein X' has the same meanings as described above) to yield a halohydrin of the general Formula XII, and then dehydrating the latter with a dehydrating agent to yield an objective compound (II).

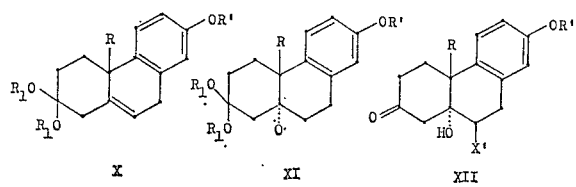

wherein R and R' each has the same meanings as described above; $R_1$ and $R_2$ represent a lower alkyl group or, combined each other, ethylene or triethylene group; and X' has the same meanings as described above.

The ketal derivatives of the above Formula X are those of dimethyl ketal, diethyl ketal, dipropyl ketal, ethylene ketal, trimethylene ketal, and the like. The ketalization may be carried out as usual way by reacting the starting compound (IX) with a corresponding alcohol (e.g. methanol, ethanol, propanol, ethylene glycol, trimethylene glycol etc.) in the presence of a catalyst (e.g. p-toluenesulfonic acid, borontrifluoride, selenium dioxide, perchloric acid, hydrogen chloride etc.). In this reaction the double bond (1–10a) conjugated with the carbonyl group at the 2-position may be shifted to the β,γ-deconjugated position (10–10a).

The epoxydation of the compounds (X) to the compounds (XI) is achieved by reacting a compound (X) with a peracid such as performic acid, peracetic acid, trifluoroperacetic acid, perbenzoic acid, m-chloroperbenzoic acid, m- or p-nitroperbenzoic acid, perphthalic acid, or the like in a suitable solvent (e.g. benzene, chloroform, dichloromethane, dichloroethane, ether, tetrahydrofuran, dioxane, acetone, ethyl acetate etc.).

The halohydrin formation from the compounds (XI) to the compounds (XII) is carried out by reacting an epoxide (XI) with a hydrogen halide (i.e. hydrogen fluoride, hydrogen chloride, or a salt thereof with pyridine) in a suitable solvent (e.g. chloroform, dichloromethane, dichloroethane, methanol, ethanol, ether, tetrahydrofuran, dioxane, acetone, water, or a mixture thereof) at low temperature or room temperature.

The dehydration of the compounds (XII) to the objective compounds (II) is achieved by interacting a halohydrin (XII) with a dehydrating agent (e.g. thionyl chloride, phosphorus oxychloride, phosphorus trichloride, phosphorus pentachloride, phosphorus tribromide, hydrogen chloride, hydrochloric acid, sulfuric acid, an arylsulfonic acid, phosphorus pentoxide, acetic anhydride, sodium bisulfite, potassium bisulfite, sodium bicarbonate, potassium bicarbonate, sodium carbonate, potassium carbonate, an inorganic acid chloride, an anhydrous inorganic salt, alumina, an aluminum salt etc.). The β-configuration of the halogen atom at the 10- position in the halohydrin (XII) may be sustained or inverted to the α-configuration according to the reaction condition used. For example, the dehydration with thionyl chloride sustains the β-configuration, and, on the other hand, the dehydration with hydrogen chloride affords the compounds (II) possessing the α-configuration.

The respective compounds of the general Formulae III and IV can be prepared by enolizing the starting compounds (IX) and the above-described compounds (II) to yield the enol derivatives of the general Formula XIII:

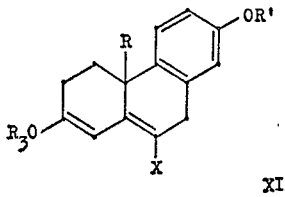

XIII wherein R, R', and X each has the same meanings as described above; and $R_3$ represents a lower alkyl group, and then dehydrogenating the latter with a dehydrogenating agent of a quinone type.

The enolization of the compounds (IX) and (II) is carried out according to the reaction condition of enolization as usual, for example, by interacting the compounds (IX) and (II) with 2,2-dimethoxypropane or methyl-, ethyl-, or propyl-orthoformate in a suitable solvent (e.g. methanol, ethanol, propanol, dioxane, benzene etc.) in the presence of an acid catalyst (e.g. p-toluene-sulfonic acid, sulfuric acid etc.) to yield the corresponding methyl- and propyl-enol ethers (XIII).

The dehydrogenation of the enol derivatives (XIII) is achieved by a dehydrogenating agent of a quinone type. In the present invention, DDQ (2,3-dichloro-5,6-dicyano-1,4-benzoquinone) is preferably used as a dehydrogenating agent of a quinone-type. The solvents used are dioxane, tetrahydrofuran, benzene, toluene, t-butanol, acetic acid, ethyl acetate, trichloroethylene, and a mixture thereof, and more preferable solvent is aqueous acetone containing a small amount of water. The reaction proceeds very well at room temperature or low temperature, and moreover it is proper to use an acid catalyst such as p-toluenesulfonic acid, trichloroacetic acid, p-nitrophenol, picric acid, maleic acid, oxalic acid, 3,5-dinitrobenzoic acid, or the like. Besides the above-cited DDQ, as dehydrogenating agent of a quinone type in the present invention, tetrachloro-1,4-benzoquinone (chloranil), 2,3-dibenzoyl-1,4-benzoquinone, or the like may be used.

The compounds of the general Formula V can be prepared from the above-described compounds (IV) by the selective dehydrogenation. In the present invention, the selective introduction of the double bond at the 3–4 position may be carried out according to the dehydrogenation method for the preparation of $\Delta^{1,4}$-3-keto-steroids or terpenoids, for example, the method by selenium dioxide or a derivative thereof (e.g. dibenzoyloxyselenoxide) (e.g. H. J. Ringold et al., J. Am. Chem. Soc., 81, 5991 (1959)) or a quinone-type dehydrogenating agent such as DDQ, chloranil, fluoranil, 2,3,5,6-tetracyano-1,4-benzoquinone, 2,3-dicyano-1,4-benzoquinone, 2,3-dibromo-5,6-dicyano-1,4-benzoquinone, or the like (e.g. D. Walker & J. D. Hiebert, Chem. Rev., 67, 1953 (1967)).

The reaction, for example in the case of the reaction by selenium dioxide, may be carried out by heating under stirring a solution of the starting compound and selenium dioxide in a solvent such as an alcohol (e.g. t-butanol, t-amyl alcohol etc.) or a lower fatty acid (e.g. acetic acid etc.) or a mixture thereof, if necessary, adding pyridine. The reaction by DDQ may be carried out in a solvent such as dioxane, tetrahydrofuran, benzene, t-butanol, or the like, and the reaction by chloranil may be carried out in a lower alcohol such as t-butanol, s-amyl alcohol, or the like, under heating in any case. This reaction condition may be applied to the formation of the compounds of the general Formula XIV:

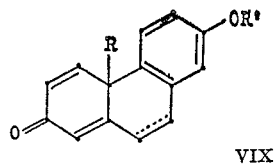

VIX wherein R and R' each has the same meanings as described above; and the dotted line indicates an optional 9,10 double bond, which may be utilized as intermediates for the preparation of the cyclopropanophenanthrene compounds of the general Formulae VI and VII, from the compounds (III) and (IX).

The cyclopropanophenanthrene compounds represented by the general Formulae VI, VII, and VIII can be prepared from the above-described compounds (XIV) and (V) respectively. In general, it is known that cyclopropane ring can be prepared by adding a methylene group into an olefin by means of the some reaction methods such as formation and addition of the so-called carbene or addition of a carbenoid reagent, e.g. Simmons-Smith reaction (H. E. Simmons and R. D. Smith, J. Am. Chem. Soc., 80, 5323 (1958)). In the present invention, the cyclopropane formation may preferably be accomplished by reacting a double bond with diazomethane (R. Wiechert and E. Kaspar, Chem. Ber., 93, 1710 (1960)) or by reacting with dimethylsulfoxonium methylide (E. J. Corey and M. Chaykovsky, J. Am. Chem. Soc., 87, 1353 (1965); G. W. Krakower and H. Ann Van Dine, J. Org. Chem., 31, 3467 (1966)).

General procedure by reaction with diazomethane consists in dissolving the above-described compounds (XIV) or (V) in a diazomethane-ether solution and keeping at room temperature or low temperature for several minutes or several days. This affords intermediately a pyrazoline derivative of the general Formula XV:

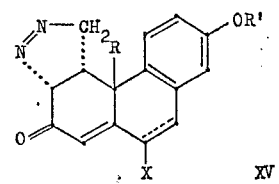

XV wherein R, R', X, and the dotted line each has the same meanings as described above. In this reaction a suitable aprotic solvent as co-solvent such as benzene, toluene, dioxane, tetrahydrofuran, chloroform, dichloromethane, carbon tetrachloride, hexane, or the like may be used under consideration of solubility of the starting materials. Thus resultant pyrazoline derivative (XV) is then converted into the objective cyclopropanophenanthrene compounds (VI), (VII), and (VIII) by acid or thermal decomposition. Acid decomposition may be carried out by keeping the intermediate (XV) at room temperature in a suitable inert solvent in the presence of perchloric acid or boron trifluoride-ether complex. This reaction proceeds being accompanied by evolution of nitrogen gas. Thermal decomposition may be carried out by heating the pyrazoline intermediate (XV) without any solvent or in a suitable highly boiling solvent.

The reaction utilizing dimethylsulfoxonium methylide may be carried out by dissolving the starting compounds (XIV) or (V) in dimethylsulfoxonium methylide-dimethylsulfoxide solution and then keeping at room temperature for several hours or several days with stirring.

The novel compounds of the present invention respectively exhibit highly potent anti-androgenic, anti-myogenic and anti-thymolitic activities without any other hormonal activity and therefore they are useful as medicaments for anti-androgenic therapy such as hirsutism, prostatauxe, prostatelcosis, prostatalgia, prostatism, or precocious diseases. The compounds are further useful for prophylactic and therapy against acne, especially acne vulgaris of sebaceous type since they exhibit controlling effect to excess secretion from the sebaceous glands.

When the compounds of the present invention are employed as medicaments for anti-androgenic therapy they may be administered alone or in combination with pharmaceutically acceptable carriers, the proportion of which is determined by the solubility and chemical nature of the compound, chosen route of administration and standard pharmaceutical practice. For example, they may be orally administered in single or divided doses containing from 0.1–100 mg. of the active ingredient in the form of tablets or capsules for oral administration. They may also be injected parenterally, that is intramuscularly, intravenously or subcutaneously, in the form of a sterile solution containing other per se conventional solutes.

When the compounds of the present invention are employed for prophylactic or therapy against acne they may be administered in solution or ointment in suitable vehicles containing from 0.01–5% of the active ingredient.

The invention will be better explained by the following examples which are not intended as a limitation thereof. All temperature stated are in degree centigrade (° C.).

EXAMPLE 1

10β-chloro-4aβ-methyl-7-methoxy-2,3,4,4a,9,10-hexahydrophenanthren-2-one

A mixture of 22.5 g. of 4aβ-methyl-7-methoxy-2,3,4,4a,9,10-hexahydrophenanthren-2-one, 0.9 g. of p-toluenesulfonic acid, 25 ml. of ethylene glycol, and 840 ml. of anhydrous benzene is refluxed for 15 hours with separation of water by azeotropic distillation. The reaction mixture is poured into ice-cooled 2 N sodium carbonate solution and extracted with ether. The ether extract is washed with water, dried over anhydrous sodium sulfate, and evaporated to dryness to yield crude crystals, which on recrystallization from dichloromethane-ether afford 22.6 g. of the ketal derivative, 2,2-ethylenedioxy-4aβ-methyl-7-metoxy - 1,2,3,4,4a,9 - hexahydrophenanthren-2-one, having M.P. 121–123° C.

IR: $\nu_{max.}^{CCl_4}$ 1615, 1586, 1503, 1243, 1118, 1078, 993 cm.$^{-1}$

Analysis.—Calcd. for $C_{18}H_{22}O_3$ (percent): C, 75.49; H, 7.74. Found (percent): C, 75.47; H, 7.71.

To a solution of 22.25 g. of the above resultant ketal derivative in 150 ml. of dichloromethane is added dropwise a soluiton of 18.7 g. of m-chloroperbenzoic acid (82% purity) in 280 ml. of dichloromethane at 0–2° C. under stirring over a period of 20 minutes. The reaction mixture is stirred at the same temperature for 30 minutes and then at room temperature for 3.5 hours. Then, the reaction mixture is poured into ice-cooled 2 N-sodium carbonate solution and the organic layer is separated. The aqueous layer is further extracted with dichloromethane and the combined organic layer is washed with 1 N-sodium carbonate solution and then with water, dried over anhydrous sodium sulfate, and evaporated to dryness to yield a crystalline material, which on recrystallization from dichloromethane-acetate affords 13.08 g. of the α-epoxy derivative, 10α,10α-epoxy-2,2-ethylenedioxy-4aβ-methyl-7 - methoxy-1,2,3,4,4a,9,10a,10 - octahydrophenanthren-2-one, having M.P. 195–196° C.

IR: $\nu_{max.}^{CHCl_3}$ 1614, 1582, 1504, 1098, 1073 cm.$^{-1}$

Analysis.—Calcd. for $C_{18}H_{22}O_4$ (percent): C, 71.50; H, 7.33. Found (percent): C, 71.44; H, 7.36.

The mother liquid on chromatography over alumina affords 8.07 g. of the β-epoxy derivative, 10aβ,10aβ-epoxy-2,2-ethylenedioxy-4aβ-methyl - 7 - methoxy-1,2,3,4,4a,9,10,10a-octahydrophenanthren-2-one, having M.P. 130–131° C.

To a solution of 9.75 g. of the above resultant α-epoxy derivative in 300 ml. of tetrahydrofuran is added dropwise 18 ml. of conc. hydrochloric acid at −10° C. under stirring. The reaction mixture is kept at 0–1° C. for 2 hours under continuous stirring, poured into ice-cooled 2 N-sodium bicarbonate solution, and then extracted with dichloromethane. The extract is washed with water, dried over anhydrous sodium sulfate, and evaporated to dryness. The resulting crystalline residue is crystallized from dichloromethane-ether to afford 8.25 g. of the chlorohydrin derivative, 10β-chloro-4aβ - methyl-10aα-hy-droxy-7-methoxy - 1,2,3,4,4a,9,10,10a-octahydrophenanthren-2-one, having M.P. 161–162° C.

IR: $\nu_{max.}^{CHCl_3}$ 3536, 3366, 1718, 1614, 1578, 1502, 1261 cm.$^{-1}$

Analysis.—Calcd. for $C_{16}H_{19}O_3Cl$ (percent): C, 65.19; H, 6.50; Cl, 12.03. Found (percent): C, 64.98; H, 6.46; Cl, 12.81.

To a solution of 1.97 g. of the above resultant chlorohydrin in 15 ml. of anhydrous pyridine is added 0.81 ml. of thionyl chloride under ice-cooling. After stirring for 5 minutes, the reaction mixture is poured into ice-water and extracted with ether. The extract is washed with water, 2 N-hydrochloric acid, and then water, dried over anhydrous sodium sulfate, and evaporated to dryness. The resulting crude crystals are recrystallized from ether-pentane to afford 1.50 g. of 10β-chloro-4aβ-methyl-7-methoxy - 2,3,4,4a,9,10 - hexahydrophenanthren-2-one, having M.P. 125–126° C.

UV: $\lambda_{max.}^{EtOH}$ 232mμ (ε 23,200). IR: $\nu_{max.}^{CHCl_3}$ 1674, 1616, 1580, 1503 cm.$^{-1}$ Analysis.—Calcd. for $C_{16}H_{17}O_2Cl$ (percent): C, 69.43; H, 6.19; Cl, 12.81. Found (percent): C, 69.61; H, 6.20; Cl, 12.59.

EXAMPLE 2

10β-chloro-4aβ-ethyl-7-methoxy-2,3,4,4a,9,10-hexahydrophenanthren-2-one

A mixture of 30.0 g. of 4aβ-ethyl-7-methoxy-2,3,4,4a,9,10-hexahydrophenanthren-2-one, 900 mg. of p-toluenesulfonic acid, 21.8 g. of ethylene glycol, and 1500 ml. of anhydrous benzene is refluxed for 2 hours with separation of water by azeotropic distillation. After cooling, the reaction mixture is poured into aqueous sodium carbonate solution and the product is extracted with ether. The ether extract is washed with water, dried over anhydrous sodium sulfate, and evaporated to dryness to yield crude crystals, which on recrystallization from methanol afford 32.5 g. of the ketal derivative, 4aβ-ethyl-2,2-ethylenedioxy-7-methoxy - 1,2,3,4,4a,9 - hexahydrophenanthren-2-one, having M.P. 107–108° C.

UV: $\lambda_{max.}^{95\% EtOH}$ 278, 286 mμ (ε 1,830, 1,760). IR: $\nu_{max}^{CCl}$ 1615, 1589, 1504, 1243, 1117, 1087, 1044 cm.$^{-1}$ Analysis.—Calcd. for $C_{19}H_{24}O_3$ (percent): C, 75.97; H, 8.05. Found (percent): C, 75.82; H, 8.19.

To a solution of 5.00 g. of the above resultant ketal derivative in 30 ml. of dichloromethane is added dropwise a solution of 3.72 g. of m-chloroperbenzoic acid in 37 ml. of dichloromethane below 5° C. under stirring over a period of 14 minutes. After completion of addition, the reaction mixture is further stirred at room temperature for 3 hours and then poured into cooled 2 N-sodium carbonate solution. The product is extracted with ether, washed with water, dried over anhydrous sodium sulfate, and evaporated to dryness to yield crude crystals, which on recrystallization from acetone-ether afford 4.88 g. of the α-epoxy derivative, 10α,10aα-epoxy-4aβ-ethyl-2,2-ethylenedioxy - 7 - methoxy-1,2,3,4a,9,19,10a-octahydrophenanthren-2-one, having M.P. 121–122° C.

UV: $\lambda_{max.}^{95\% EtOH}$ 276.5, 283.5 mμ (ε 1,620, 1,510). IR: $\nu_{max.}^{CCl_4}$ 1614, 1580, 1503, 1128, 1098, 1028 cm.$^{-1}$ Analysis.—Calcd. for $C_{19}H_{24}O_4$ (percent): C, 72.12; H, 7.65. Found (percent): C, 72.40; H, 7.83.

To a solution of 150 mg. of the above resultant α-epoxy derivative in 5 ml. of tetrahydrofuran is added 0.20 ml. of conc. hydrochloric acid at −5° C. under stirring. The reaction mixture is kept at 0–5° C. for 3 hours under continuous stirring and then poured into cooled saturated sodium bicarbonate solution, and the product is extracted with ether. The extract is washed with water, dried over anhydrous sodium sulfate, and evaporated to dryness. The resulting residue is crystallized from ether to afford 89 mg. of the chlorohydrin derivative, 10β-chloro-4aβ-ethyl - 10aα - hydroxy-7-methoxy-1,2,3,4,4a9,10,10a-octahydrophenanthren-2-one, having M.P. 135–136° C.

IR: $\nu_{max.}^{CCl_4}$ 3550, 3336, 1730, 1613, 1580, 1501 cm.$^{-1}$

Analysis.—Calcd. for $C_{17}H_{21}O_3Cl$ (percent): C, 66.12; H, 6.86; Cl, 11.48. Found (percent): C, 65.74; H, 7.29; Cl, 11.74.

To a solution of 3.299 g. of the above resultant chlorohydrin derivative in 26 ml. of anhydrous pyridine is added 1.3 ml. of thionyl chloride under ice-cooling. After stirring for 5 minutes, the reaction mixture is poured into ice-water and extracted with ether. The ether extract is washed with water, 2 N-hydrochloric acid, and then water, dried over anhydrous sodium sulfate, and evaporated to dryness. The resulting crude crystals are recrystallized from ether-pentane to afford 1.833 g. of 10β-chloro-4aβ-ethyl - 7 - methoxy - 2,3,4,4a,9,10 - hexahydrophenanthren-2-one having M.P. 95.5–97° C.

UV: $\lambda_{max.}^{95\% EtOH}$ 232, 244.5 mμ (ε 17,200, 14,500). IR: $\nu_{max.}^{CCl_4}$ 1680, 1615, 1580, 1501, 1254, 1043 cm.$^{-1}$ Analysis.—Calcd. for $C_{17}H_{19}O_2Cl$ (percent): C, 70.21; H, 6.59; Cl, 12.19. Found (percent): C, 70.38; H, 6.95; Cl, 12.44.

EXAMPLE 3

10α-chloro-4aβ-methyl-7-methoxy-2,3,4,4a,9,10-hexahydrophenanthren-2-one

Gaseous hydrogen chloride is passed in a solution of 700 mg. of 10β-chloro - 4aβ - methyl-10aα-hydroxy-7-methoxy-1,2,3,4,4a,9,10,10a-octahydrophenanthren - 2 - one in 90 ml. of glacial acetic acid for 2 hours under water-cooling (about 10° C) and stirring. After stopping the introduction of hydrogen chloride, the reaction mixture is further stirred at room temperature for 1 hour and then poured into ice-water. The product is extracted with dichloromethane, washed with water, dried over anhydrous sodium sulfate, and evaporated to dryness to yield 647 mg. of crude crystals, which on recrystallization from dichloromethane-ether afford 567 mg. of 10α-chloro-4aβ-methyl-7-methoxy - 2,3,4,4a,9,10-hexahydrophenanthren 2-one having M.P. 160–162° C.

UV: $\lambda_{max.}^{EtOH}$ 230 mμ (ε 23,700). IR: $\nu_{max.}^{CCl_4}$ 1685, 1614, 1503, 1246, 876 cm.$^{-1}$ Analysis.—Calcd. for $C_{16}H_{17}O_2Cl$ (percent): C, 69.43; H, 6.19; Cl, 12.81. Found (percent): C, 69.39; H, 6.23; Cl, 13.36.

EXAMPLE 4

10α-chloro-4aβ-ethyl-7-methoxy-2,3,4,4a,9,10-hexahydrophenanthren-2-one

According to the same procedure as Example 3, a solution of 725 mg. of 10β-chloro-4aβ-ethyl-10aα-hydroxy-7-methoxy - 1,2,3,4,4a,9,10,10a - octahydrophenanthren - 2-one in 90 ml. of glacial acetic acid is treated with gaseous hydrogen chloride. The resulting product is recrystallized from dichloromethane-ether to afford 420 mg. of 10α-chloro-4aβ-ethyl - 7 - methoxy - 2,3,4,4a,9,10-hexahydrophenanthren-2-one having M.P. 126–127° C.

UV: $\lambda_{max.}^{EtOH}$ 231 mμ (ε 23,100)

Analysis.—Calcd. for $C_{17}H_{19}O_2Cl$ (percent): C, 70.21; H, 6.59; Cl, 12.19. Found (percent): C, 70.32; H, 6.57; Cl, 12.64.

EXAMPLE 5

4aβ-methyl-7-methoxy-2,3,4,4a-tetrahydrophenanthren-2-one

To a solution of 4.8 g. of 4aβ-methyl-7-methoxy-2,3,4,4a,9,10-hexahydrophenanthren-2-one in 250 ml. of anhydrous benzene are added 20 ml. of ethanol, 20 ml. of ethyl orthoformate, and 250 mg. of p-toluenesulfonic acid hydrate, and the solution is kept at room temperature for 3 hours under nitrogen atmosphere. Then, the reaction mixture is poured into ice-water saturated with sodium bicarbonate and the product is extracted with ether, washed with water, dried over anhydrous sodium sulfate, and evaporated to dryness under reduced pressure to yield 5.6 g. of the enol ether derivative, 2-ethoxy-4aβ-methyl-7-methoxy-3,4,4a,9-tetrahydrophenanthrene.

To a solution of this enol ether derivative in 320 ml. of 95% acetone is added a solution of 6.0 g. of DDQ in 175 ml. of 95% acetone, and the solution is kept at room temperature for 10 minutes under stirring. The reaction mixture is poured into ice-water and the product is extracted with ether, washed with 2 N-sodium carbonate solution and then water, dried over anhydrous sodium sulfate, and evaporated to dryness under reduced pressure to yield 5.31 g. of residue, which is passed through a column of 60 g. of alumina. Eluate with petroleum ether-benzene (1:1–1:2) is crystallized from ether-pentane to afford 3.62 g. of 4aβ-methyl-7-methoxy-2,3,4,4a-tetrahydrophenanthren-2-one having M.P. 108–109° C.

UV: $\lambda_{max.}^{EtOH}$ 215, 245, 265, 326, 366 mμ (ε 18,900, 14,400, 8,830, 11,700, 8,200)

Analysis.—Calcd. for $C_{16}H_{16}O_2$ (percent): C, 79.97; H, 6.71. Found (percent): C, 80.81; H, 6.78.

EXAMPLE 6

4aβ-ethyl-7-methoxy-2,3,4,4a-tetrahydrophenanthren-2-one

A benzene solution of 20 g. of 4aβ-ethyl-7-methoxy-2,3,4,9,10,12-hexahydrophenanthren-2-one in 1 liter of anhydrous benzene is dried by azeotropic distillation. The solution, to which are added 88 ml. of ethanol, 88 ml. of ethyl orthoformate, and 1 g. of pyridine·hydrochloride, is refluxed for 7 hours under nitrogen atmosphere. After cooling, the reaction mixture is poured into ice-cooled 2 N-sodium carbonate solution and the product is extracted with ether, washed with water, dried over anhydrous sodium sulfate, and evaporated to dryness under reduced pressure to yield 24.4 g. of the enol ether derivative, 2 - ethoxy-4aβ-ethyl-7-methoxy-3,4,4a,9-tetrahydrophenanthrene.

To a solution of this enol ether derivative in 1.3 liter of 95% acetone is added a solution of 23.4 g. of DDQ in 700 ml. of 95% acetone, and the solution is kept at room temperature for 10 minutes under stirring. The reaction mixture is poured into ice-water and the product is extracted with ether, washed with 2 N-sodium carbonate solution and then water, dried over anhydrous sodium sulfate, and evaporated to dryness under reduced pressure to yield 18.9 g. of residue, which on crystallization from acetone-ether affords 15.79 g. of 4aβ-ethyl-7-methoxy-2,3,4,4a-tetrahydrophenanthren-2-one having M.P. 86–87° C.

UV: $\lambda_{max.}^{95\% EtOH}$ 248, 264.5, 327 mμ (ε 13,500, 9,800, 8,300). IR: $\nu_{max.}^{CCl_4}$ 1665, 1603, 1563, 1494, 1256, 1045 cm.$^{-1}$ Analysis.—Calcd. for $C_{17}H_{18}O_2$ (percent): C, 80.28; H, 7.13. Found (percent): C, 80.39; H, 7.15.

EXAMPLE 7

10-chloro-4αβ-methyl-7-methoxy-2,3,4,4a-tetrahydrophenanthren-2-one

To a solution of 276 mg. of 10-chloro-4aβ-methyl-7-methoxy-2,3,4,4a,9,10-hexahydrophenanthren-2-one in 22 ml. of anhydrous benzene are added 1.1 ml. of anhydrous ethanol, 1.1 ml. of ethyl orthoformate, and 10 mg. of p-toluenesulfonic acid, and the solution is kept at room temperature for 2.5 hours under nitrogen atmosphere. Treatment according to the same procedure as Example 5 affords 320 mg. of the enol ether derivative, 10-chloro-2-ethoxy-4aβ-methyl-7-methoxy - 3,4,4a,9 - tetrahydrophenanthrene.

To a solution of the enol ether derivative in 20 ml. of 95% acetone is added a solution of 250 mg. of DDQ in 11 ml. of 95% acetone, and the solution is kept at room temperature for 25 minutes under stirring. The product obtained by treating according to the same procedure as Example 5 is crystallized from ether-pentane to yield 235 mg. of 10-chloro-4aβ-methyl-7-methoxy-2,3,4,4a-tetrahydrophenanthren-2-one having M.P. 97–98° C.

UV: $\lambda_{max.}^{EtOH}$ 216.5, 247.5, 270, 333.5, 374 mμ (ε 23,300, 15,900, 10,300, 11,900, 8,100). IR: $\nu_{max.}^{CCl_4}$ 2846, 2826, 1674, 1614, 1603, 1584, 1562, 1501, 1495, 1268, 1254 cm.$^{-1}$ Analysis.—Calcd. for $C_{16}H_{15}O_2Cl$ (percent): C, 69.94; H, 5.50; Cl, 12.91. Found (percent): C, 69.66; H, 5.57; Cl, 13.12.

EXAMPLE 8

10-chloro-4aβ-ethyl-7-methoxy-2,3,4,4a-tetrahydrophenanthren-2-one

To a solution of 1.47 g. of 10-chloro-4aβ-ethyl-7-methoxy - 2,3,4,4a,9,10-hexahydrophenanthren-2-one in 150 ml. of anhydrous benzene are added 7 ml. of anhydrous ethanol, 7 ml. of ethyl orthoformate, and 80 mg. of p-toluenesulfonic acid hydrate and the solution is kept at room temperature for 2 hours under nitrogen atmosphere. Treatment according to the same procedure as Example 5 affords 2.36 g. of the enol ether derivative, 10-chloro-2-ethoxy-4aβ-ethyl - 7 - methoxy-3,4,4a,9-tetrahydrophenanthrene.

To a solution of the enol ether derivative in 100 ml. of 95% acetone is added a solution of 1.35 g. of DDQ in 40 ml. of 95% acetone and the solution is kept at room temperature for 15 minutes under stirring. The product obtained by treating as usual manner is passed through a column of 30 g. of alumina and the elution with benzene affords 1.35 g. of 10-chloro-4aβ-ethyl-7-methoxy-2,3,4,4a-tetrahydrophenanthren-2-one having B.P. 180° C./0.015 mm. Hg (bath temperature).

UV: $\lambda_{max.}^{EtOH}$ 249.5, 270, 334, 378 mμ (ε 15,770, 10,450, 11,190, 8,250). IR: $\nu_{max.}^{CCl_4}$ 1675, 1614, 1603, 1563, 1499, 1268, 1254, 1040, 894 cm.$^{-1}$ Analysis.—Calcd. for $C_{17}H_{17}O_2Cl$ (percent): C, 70.70; H, 5.93; Cl, 12.28. Found (percent): C, 70.13; H, 5.89; Cl, 12.15.

EXAMPLE 9

10-chloro-4aβ-methyl-7-methoxy-2,4a-dihydrophenanthren-2-one

To a solution of 3.57 g. of 10-chloro-4aβ-methyl-7-methoxy-2,3,4,4a-tetrahydrophenanthren-2-one in 180 ml. of t-butanol are added 0.58 ml. of anhydrous pyridine and 1.73 g. of selenium dioxide and the solution is refluxed for 15.5 hours under nitrogen atmosphere. After cooling, the reaction mixture is poured into ice-water and the product is extracted with dichloromethane. The extract is washed with water, dried over anhydrous sodium sulfate, and evaporated to dryness under reduced pressure to afford 3.8 g. of a reddish yellow oily material, which is chromatographed on a column of 125 g. of silica gel (Woelm grade-II: containing 10% of water). Eluate with benzene or benzene-chloroform (3:7) is recrystallized from dichloromethane-ether to yield 2.24 g. of 10-chloro-4aβ-methyl-7-methoxy-2,4a-dihydrophenanthren - 2 - one having M.P. 130–131° C.

UV: $\lambda_{max.}^{EtOH}$ 230, 263, 335, 383 mμ (ε 21,660, 16,310 9,090, 5,080). IR: $\nu_{max.}^{CCl_4}$ 1664, 1629, 1603, 1563, 1498, 1481, 1265, 1258, 898, 890 cm.$^{-1}$ Analysis.—Calcd. for $C_{16}H_{13}O_2Cl$ (percent): C, 70.46; H, 4.80; Cl, 13.00. Found (percent): C. 70.06; H, 4.84; Cl, 13.25.

EXAMPLE 10

10-chloro-4aβ-ethyl-7-methoxy-2,4a-dihydrophenanthren-2-one

To a solution of 360 mg. of 10-chloro-4aβ-ethyl-7-methoxy-2,3,4,4a-tetrahydrophenanthren-2-one in 15 ml. of t-butanol are added 0.27 ml. of anhydrous pyridine and 167 mg. of selenium dioxide and the solution is refluxed for 20 hours under nitrogen atmosphere. After treating according to the same procedure as Example 9, the resulting oily residue is purified through a column of alumina to yield 210 mg. of 10-chloro-4aβ-ethyl-7-methoxy-2,4a-dihydrophenanthren-2-one having B.P. 140–150° C./0.002 mm. Hg (bath temperature).

UV: $\lambda_{max.}^{EtOH}$ 232, 263.4 mμ (ε 18,700, 16,500). IR: $\nu_{max.}^{CCl_4}$ 1665, 1630, 1604, 1560, 1495, 1255 cm.$^{-1}$ Analysis.—Calcd. for $C_{17}H_{15}O_2Cl$ (percent): C, 71.20; H, 5.27; Cl, 12.37. Found (percent): C, 71.43; H, 5.37; Cl, 12.11.

EXAMPLE 11

4aβ-methyl-3α,4α-methylene-7-methoxy-2,3,4,4a,9,10-hexahydrophenanthren-2-one

To a solution of diazomethane in ether, prepared from 7.2 g. of N-nitrosomethylurea, 20 ml. of 40% potassium hydroxide solution, and 90 ml. of ether, is added a solution of 770 mg. of 4aβ-methyl-7-methoxy-2,4a,9,10-tetrahydrophenanthren-2-one in 11 ml. of dichloromethane. The solution is kept at room temperature for 4.5 hours and then evaporated under reduced pressure to yield 930 mg. of crude crystals, which on recrystallization from dichloromethane-ether afford 725 mg. of 4aβ-methyl-7-methoxy-3α,4α-(3′,4′,1′-pyrazolino) - 2,3,4,4a,9,10 - hexahydrophenanthren-2-one having M.P. 138–139° C.

UV: $\lambda_{max.}^{EtOH}$ 230 mμ (ε 16,100). IR: $\nu_{max.}^{CCl_4}$ 1678, 1633, 1613, 1503, 1264, 1244, 879 cm.$^{-1}$ Analysis.—Calcd. for $C_{17}H_{18}O_2N_2$ (percent): C, 72.32; H, 6.43; N, 9.92. Found (percent): C, 72.29; H, 6.43; N, 10.22.

A solution of 700 mg. of this pyrazoline derivative and 2 ml. of 60% perchloric acid in 200 ml. of acetone is kept at room temperature for 10 minutes. The reaction mixture is neutralized with 2 N-sodium carbonate solution and then acetone is removed off. The product is extracted with dichloromethane, washed with water, dried over anhydrous sodium sulfate, and evaporated to dryness to yield 581 mg. of residue, which on crystallization from ether-pentane affords 456 mg. of 4aβ-methyl-3α,4α-methylene-7-methoxy - 2,3,4,4a,9,10 - hexahydrophenanthren-2-one having M.P. 113.5–114.5° C.

UV: $\lambda_{max.}^{EtOH}$ 229 mμ (ε 23,500). IR: $\nu_{max.}^{CCl_4}$ 1671, 1613, 1575, 1503, 1286, 1272, 1256, 1249, 1037, 954, 873, 868 cm.$^{-1}$ Analysis.—Calcd. for $C_{17}H_{18}O_2$ (percent): C, 80.28; H, 7.13. Found (percent): C, 80.56; H, 7.15.

EXAMPLE 12

4aβ-ethyl-3α,4α-methylene-7-methoxy-2,3,4,4a,9,10-hexahydrophenanthrene-2-one

To a solution of diazomethane in ether, prepared from 17 g. of N-nitrosomethylurea, 49 ml. of 40% potassium hydroxide solution, and 220 ml. of ether, is added a solution of 2.44 g. of 4aβ-ethyl-7-methoxy-2,4a,9,10-tetrahydrophenanthren-2-one in 35 ml. of dichloromethane. The solution is kept overnight at room temperature and then evaporated under reduced pressure to yield crude crystals, which on recrystallization from dichloromethane-ether afford 2.33 g. of 4aβ-ethyl-7-methoxy-3α,4α-(3′,4′-

1'-pyrazolino) - 2,3,4,4a,9,10 - hexahydrophenanthren-2-one having M.P. 123–124.5° C.

UV: $\lambda_{max}^{EtOH}$ 230, 245, 327, m$\mu$ ($\epsilon$ 18,350, 14,390, 460). IR: $\nu_{max}^{CCl_4}$ 1677, 1628, 1612, 1244, 1039, 885 cm.$^{-1}$ Analysis.—Calcd. for $C_{18}H_{20}O_2N_2$ (percent): C, 72.95; H, 6.80; N, 9.45. Found (percent): C, 72.90; H, 6.93; N, 9.75.

A solution of 550 mg. of this pyrazoline derivative and 1.6 ml. of 60% perchloric acid in 160 ml. of acetone is kept at room temperature for 15 minutes. The reaction mixture is cooled with ice-piece and neutralized with 2 N-sodium carbonate solution and then acetone is removed off. Treatment as usual manner affords 547 mg. of residue, which on crystallization from dichloromethane-ether affords 404 mg. of 4a$\beta$-ethyl-3$\alpha$,4$\alpha$-methylene-7-methoxy-2,3,4,4a,9,10-hexahydrophenanthren-2-one having M.P. 102–102.5° C.

UV: $\lambda_{max}^{EtOH}$ 229, 278, 285 m$\mu$ ($\epsilon$ 21,580, 2,170, 1,980). IR: $\nu_{max}^{CCl_4}$ 1672, 1613, 1576, 1504, 1256, 1244, 1043, 909, 817 cm.$^{-1}$ Analysis.—Calcd. for $C_{18}H_{20}O_2$ (percent): C, 80.56; H, 7.51. Found (percent): C, 80.17; H, 7.47.

EXAMPLE 13

4a$\beta$-methyl-3$\alpha$,4$\alpha$-methylene-7-methoxy-2,3,4,4a-tetrahydrophenanthren-2-one To a solution of diazomethane in ether, prepared from 7.9 g. of N-nitrosomethylurea, 22 ml. of 40% potassium hydroxide solution, and 98 ml. of ether, is added a solution of 840 mg. of 4a$\beta$-methyl-7-methoxy-2,4a-dihydrophenanthren-2-one in 12 ml. of dichloromethane and the solution is kept at room temperature for 3 hours. The product obtained by treatment according to the same procedure as the Example 11 is crystallized from dichloromethane-ether to afford 805 mg. of 4a$\beta$-methyl-7-methoxy - 3$\alpha$,4$\alpha$ - (3',4',1'-pyrazolino)-2,3,4,4a-tetrahydrophenanthren-2-one having M.P. 141.5–143.5° C.

UV: $\lambda_{max}^{EtOH}$ 218, 248, 270, 332, 382 m$\mu$ ($\epsilon$ 18,600, 12,100, 8,900, 12,100, 8,600). IR: $\nu_{max}^{CHCl_3}$ 1661, 1606, 1568, 1500, 1286, 1270, 1251, 1029, 889 cm.$^{-1}$ Analysis.—Calcd. for $C_{17}H_{16}O_2N_2$ (percent): C, 72.84; H, 5.75; N, 9.99. Found (percent): C, 72.67; H, 5.74; N, 10.11.

A solution of 630 mg. of this pyrazoline derivative and 1.8 ml. of 60% perchloric acid in 180 ml. of acetone is kept at room temperature for 10 minutes. The product obtained by treatment according to the same procedure as Example 11 is crystallized from ether-pentane and recrystallized from dichloromethane-ether to yield 515 mg. of 4a$\beta$-methyl-3$\alpha$,4$\alpha$-methylene-7-methoxy-2,3,4,4a-tetrahydrophenanthren-2-one having M.P. 127.5–129° C.

UV: $\lambda_{max}^{EtOH}$ 216, 247, 325 m$\mu$ ($\epsilon$ 21,900, 15,600, 10,700). IR: $\nu_{max}^{CCl_4}$ 1664, 1609, 1565, 1497, 1286, 1273, 1259, 1073, 883 cm.$^{-1}$ Analysis—Calcd. for $C_{17}H_{16}O_2$ (percent): C, 80.92; H, 6.39. Found (percent): C, 80.79; H, 6.26.

EXAMPLE 14

4a$\beta$-ethyl-3$\alpha$,4$\alpha$-methylene-7-methoxy-2,3,4,4a-tetrahydrophenanthren-2-one To a solution of diazomethane in ether, prepared from 24 g. of N-nitrosomethylurea, 68 ml. of 40% potassium hydroxide solution, and 310 ml. of ether, is added a solution of 2.57 g. of 4a$\beta$-ethyl-7-methoxy-2,4a$\beta$-dihydrophenanthren-2-one in 37 ml. of dichloromethane and the solution is kept at room temperature for 3 hours. Treatment according to the same procedure as the Example 11 affords crude crystals, which on recrystallization from dichloromethane-ether afford 3.20 g. of 4a$\beta$-ethyl - 7 - methoxy - 3$\alpha$,4$\alpha$-(3',4',1'-pyrazolino)-2,3,4,4a-tetrahydrophenanthren-2-one having M.P. 172–175° C. (decomposition).

UV: $\lambda_{max}^{EtOH}$ 219.6, 248.2, 270.9, 333, 384.5 m$\mu$ ($\epsilon$ 18,400, 11,900, 9,200, 11,700, 8,200)

Analysis.—Calcd. for $C_{18}H_{18}O_2N_2$ (percent): C, 73.45; H, 6.16; N, 9.52. Found (percent): C, 73.09; H, 6.09; N, 9.65.

A solution of 2.70 g. of this pyrazoline derivative and 4.5 ml. of 60% perchloric acid in 450 ml. of acetone is kept at room temperature for 10 minutes. The crude crystals obtained by treatment according to the same procedure as Example 11 are recrystallized from dichloromethane-ether to afford 20.2 g. of 4a$\beta$-ethyl-3$\alpha$,4$\alpha$-methylene-7-methoxy - 2,3,4,4a-tetrahydrophenanthren-2-one having M.P. 93–93.5° C.

UV: $\lambda_{max}^{EtOH}$ 235 m$\mu$ ($\epsilon$ 22,000). IR: $\nu_{max}^{CCl_4}$ 1670, 1638, 1611, 1574, 1501, 1466, 1291, 1280, 1252, 1124, 1043, 1028, 888 cm.$^{-1}$ Analysis.—Calcd. for $C_{16}H_{16}O_2$ (percent): C, 79.97; H, 6.71. Found (percent): C, 79.85; H, 6.79.

EXAMPLE 15

10-chloro-4a$\beta$-methyl-3$\alpha$,4$\alpha$-methylene-7-methoxy-2,3,4,4a-tetrahydrophenanthren-2-one To a solution of 550 mg. of 10-chloro-4a$\beta$-methyl-7-methoxy-2,4a-dihydrophenanthren-2-one in 3.5 ml. of dichloromethane is added 13 ml. of the diazomethane-ether solution prepared from 2.0 g. of N-nitrosomethylurea according to the same procedure as Example 11 and the solution is kept at room temperature for 1 hour. The product obtained by treatment as usual manner is crystallized from ether to afford 535 mg. of 10 - chloro - 4a$\beta$-methyl - 7 - methoxy-3$\alpha$,4$\alpha$-(3',4',1'-pyrazolino)-2,3,4,4a-tetrahydrophenanthren-2-one having M.P. 183–185° C.

UV: $\lambda_{max}^{EtOH}$ 221, 249.5, 273.5, 339, 389 m$\mu$ ($\epsilon$ 21,320, 12,650, 9,800, 11,100, 7,670). IR: $\nu_{max}^{CCl_4}$ 1668, 1603, 1563, 1499, 1318, 898 cm.$^{-1}$ Analysis.—Calcd. for $C_{17}H_{15}O_2N_2Cl$ (percent): C, 64.86; H, 4.80; N, 8.90; Cl, 11.26. Found (percent): C, 64.54; H, 4.82; N, 8.87; Cl, 11.72.

A solution of 998 mg. of this pyrazoline derivative and 2.4 ml. of 60% perchloric acid in 240 ml. of acetone is kept at room temperature for 10 minutes. The product obtained by treatment according to the same procedure as Example 11 is crystallized from ether to yield 711 mg. of 10 - chloro - 4a$\beta$-methyl-3$\alpha$,4$\alpha$-methylene-7-methoxy-2,3,4,4a-tetrahydrophenanthren-2-one having M.P. 145–146° C.

UV: $\lambda_{max}^{EtOH}$ 218, 249.5, 268, 332, 370 m$\mu$ ($\epsilon$ 25,710, 17,370, 12,600, 10,710, 6,920). IR: $\nu_{max}^{CCl_4}$ 1670, 1607, 1565, 1500, 1265, 1258, cm.$^{-1}$ Analysis.—Calcd. for $C_{17}H_{15}O_2Cl$ (percent): C, 71.20; H, 5.27; Cl, 12.37. Found (percent): C, 70.64; H, 5.19; Cl, 12.92.

EXAMPLE 16

10-chloro-4a$\beta$-ethyl-3$\alpha$,4$\alpha$-methylene-7-methoxy-2,3,4,4a-tetrahydrophenanthren-2-one To a solution of diazomethane in ether, prepared from 3.4 g. of N-nitrosomethylurea, 9.1 ml. of 40% potassium hydroxide solution, and 42 ml. of ether, is added a solution of 120 mg. of 10 - chloro - 4a$\beta$ - ethyl-7-methoxy-2,4a-dihydrophenanthren-2-one in 2 ml. of dichloromethane and the solution is kept at room temperature for 2½ hours. The product obtained by treatment according to the same procedure as Example 11 is crystallized from dichloromethane-ether to yield 118 mg. of 10-chloro-4a$\beta$-ethyl-7- methoxy - 3α,4α - (3',4',1'-pyrazolino)-2,3,4a-tetrahydrophenanthren-2-one having M.P. 167–168.5° C.

UV: $\lambda_{max}^{EtOH}$ 222, 253, 274, 338, 392 mμ (ε 18,100, 11,600, 10,100, 10,600, 7,200). IR: $\nu_{max}^{CCl_4}$ 1669, 1603, 1563, 1499, 1317, 1289, 1211, 1036, 896 cm.$^{-1}$

*Analysis.*—Calcd. for $C_{18}H_{19}O_2N_2Cl$ (percent): C, 65.75; H, 5.21; N, 8.52; Cl, 10.78. Found (percent): C, 65.58; H, 5.00; N, 8.40; Cl. 11.01.

A solution of 250 mg. of this pyrazoline derivative and 0.7 ml. of 60% perchloric acid in 70 ml. of acetone is kept at room temperature for 10 minutes. The product obtained by treatment as usual manner is crystalized from ether-pentane to yield 199 mg. of 10-chloro-4aβ-ethyl - 3α,4α - methylene - 7-methoxy-2,3,4,4a-tetrahydrophenanthren-2-one having M.P. 131–133° C.

UV: $\lambda_{max}^{EtOH}$ 218, 251, 268, 332, 370 mμ (ε 23,600, 15,400, 12,100, 9,360, 6,130)

*Analysis.*—Calcd. for $C_{18}H_{17}O_2Cl$ (percent): C, 71.87; H, 5.70; Cl, 11.79. Found (percent): C, 71.58; H, 5.67; Cl, 12.13.

We claim:

1. A compound selected from the group consisting of the compounds of the following structural formula:

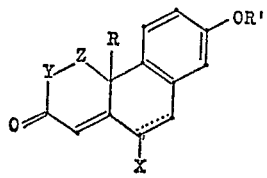

wherein R and R' each is a lower alkyl group; X is a member selected from the group consisting of a hydrogen atom and a halogen atom; Y–Z is

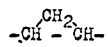

and the dotted line indicating an optional 9,10 double bond.

2. A compound according to claim 1, namely 4aβ-methyl - 3α,4α - methylene-7-methoxy-2,3,4,4a,9,10-hexahydrophenanthren-2-one.

3. A compound according to claim 1, namely 4aβ-ethyl - 3α,4α - methylene - 7 - methoxy - 2,3,4,4a,9,10-hexahydrophenanthren-2-one.

4. A compound according to claim 1, namely 4aβ-methyl - 3α,4α - methylene - 7 - methoxy - 2,3,4,4a-tetrahydrophenanthren-2-one.

5. A compound according to claim 1, namely 4aβ-ethyl-3α,4α - methylene - 7 - methoxy - 2,3,4,4a-tetrahydrophenanthren-2-one.

6. A compound according to claim 1, namely 10-chloro-4aβ - methyl - 3α,4α - methylene - 7 - methoxy-2,3,4,4a-tetrahydrophenanthren-2-one.

7. A compound according to claim 1, namely 10-chloro-4aβ - ethyl - 3α,4α - methylene - 7 - methoxy - 2,3,4,4a-tetrahydrophenanthren-2-one.

8. A compound according to claim 1, namely 10-fluoro-4aβ - methyl - 3α,4α - methylene-7-methoxy-2,3,4,4a-tetrahydrophenanthren-2-one.

9. A compound according to claim 1, namely 10-fluoro-4aβ - ethyl - 3α,4α - methylene - 7 - methoxy-2,3,4,4a-tetrahydrophenanthren-2-one.

References Cited
UNITED STATES PATENTS 2,764,616   9/1956   Hoehn et al. _____ 260—590

BERNARD HELFIN, Primary Examiner

G. A. SCHWARTZ, Assistant Examiner

U.S. Cl. X.R.

260—310 D, 348 C, 613 R, 999